United States Patent [19]

Mickus et al.

[11] 4,068,602

[45] Jan. 17, 1978

[54] COATED SEED AND METHOD OF SEEDING

[75] Inventors: Robert R. Mickus, Sacramento; James T. Munson, Robbins, both of Calif.

[73] Assignee: Rice Growers Association of California, Sacramento, Calif.

[21] Appl. No.: 698,423

[22] Filed: June 21, 1976

[51] Int. Cl.$^2$ .......................... A01C 1/06; A01C 7/00
[52] U.S. Cl. ................................ 111/1; 111/DIG. 1; 47/57.6
[58] Field of Search ................. 111/1, DIG. 1; 47/58, 47/DIG. 9, 57.6

[56] References Cited

U.S. PATENT DOCUMENTS

| | | | |
|---|---|---|---|
| 2,967,376 | 1/1961 | Scott | 47/57.6 |
| 3,499,748 | 3/1970 | Fraser | 47/57.6 X |
| 3,698,133 | 10/1972 | Schreiber | 47/57.6 |

FOREIGN PATENT DOCUMENTS

| | | | |
|---|---|---|---|
| 146,084 | 4/1952 | Australia | 111/DIG. 1 |
| 830,655 | 3/1960 | United Kingdom | 47/57.6 |
| 1,294,161 | 10/1972 | United Kingdom | 47/57.6 |
| 1,380,865 | 1/1975 | United Kingdom | 47/57.6 |

OTHER PUBLICATIONS

Science & Invention, Mar. 1927, p. 1009 relied on.
Life, Oct. 18, 1948, pp. 85, 86, 89 relied on.

*Primary Examiner*—Robert E. Bagwill
*Attorney, Agent, or Firm*—Gordon Wood

[57] ABSTRACT

The seeds to be sown are coated with a coating substantially comprising a saccharide such as glucose by mixing the seed with a saccharide solution prior to seeding. At the same time a fungicide and nutrients to improve germination may be added. The additional weight imparted to the seed by the glucose enhances the probability that the seed will be spread evenly on the seed bed, particularly when the latter is covered with water.

4 Claims, No Drawings

COATED SEED AND METHOD OF SEEDING

The present invention relates to a coated seed and particularly to the method of coating the seed to enhance germination and to improve the harvest.

Although the present invention is applicable to many types of seed, it will be specifically described with respect to seed rice and the particular problems pertaining thereto.

Heretofore it has been common practice to soak the seed rice from about 12 to 36 hours before seeding so that the weight of the seed is increased to cause the seed to sink as rapidly as possible onto the seed bed when said seed bed is covered with water, and not to be blown by the wind to one particular area. In this manner overseeded and underseeded areas are minimized.

It has also been common practice to add fungicides to the seed before or during the soaking in water to enhance germination by discouraging attack by organisms in the soil and water.

The main object of the present invention is to provide an improved coated seed with an enhanced germination rate and a method of performing such coating so as to add considerably to the weight of the seed and thus insure rapid sinking to the seed bed when the latter is covered with water.

Another object of the invention is the provision of a method of treating seed which simplifies the addition of desirable nutrients and fungicides.

Other objects and advantages will be apparent from the following specification.

By the present invention the seed is mixed with a sugar solution and with talc and at the same time a fungicide, such as one sold under the trade name "Captan" is added, together with a dye for identifying the seed and to insure that the coating uniformly covers the seed.

Also added are certain micronutrients such as zinc, iron, manganese, sulfur or other trace elements required by the plant in minute amounts. Such micronutrients, such as the agent known by the trademark MULTIPLEX, have heretofore been applied directly to the soil and usually mixed with spray or irrigation water. By the present invention such micronutrients are applied directly to the seed cover thus not only optimizing their effectiveness in promoting germination but also achieving economies over spreading the elements on the soil. By the present invention the micronutrients are placed around the seed where they are most needed. In this connection, at germination, the applied coating splits from the kernel and positions itself directly under the grain making the nutrients and additives directly available to the grain and without hindering germination.

The added talc promotes a desirable free-flowing character to the rice which is important to ease of handling and seeding especially if the seeding is effected by drilling.

The rice may be introduced through a chute to one end of a precoat glazing drum which is an elongated rotating imperforate drum. Before entry into the drum the sugar solution and talc are both preferably added. The mixing effect in the precoat drum is sufficient to cause absorption in the seed rice of all of the added materials. Upon discharge from the precoat drum the seed is fed into finishing drums to complete the mixing process and to insure that the seeds become discreet and free flowing. If desired, additional materials may be added in the finishing drums to provide "facing" or "glazing" to promote flowability in bulk handling.

As an example of a successful treatment, 1000 pounds of paddy seed rice was treated in a mixture as follows:
 1000 pounds of Paddy Seed Rice
 6 gallons sugar syrup
 3 gallons water
 40 ounces Captan
 3 ounces dye
 10 quarts Multiplex
 375 pounds talc It has been found that the above described treatment increases the weight of the seed from 20 to 30% in addition to the weight increase attributable to the added water. The above described method is therefore particularly suitable for seeding by broadcasting from airplanes because the seed tends to sink quickly to the seed bed through the water that covers it.

By the above described method of treating seed rice it is possible to obviate the normal step of soaking the seed rice in water shortly prior to seeding in order to increase its weight. The result is that the seed rice treated in accordance with the present invention may be stored for a relatively long period of time before seeding. When absorption of water only is relied on to increase the weight it is necessary to effect seeding within a relatively short period of time thereafter otherwise the desirable increase of weight will be lost by evaporation. Such loss and impairment of the viability of the seed may also be increased by heating which attends the storage.

In addition to the advantage accruing from the increase in weight it will be seen that the applied saccharide coating not only acts as a useful carrier for a fungicide but also a carrier for the required micronutrients which surround the seed in a controlled germination zone to promote early growth and root development.

Another advantage of providing a coating in accordance with the present invention lies in the fact that the film comprising the coating provides a barrier which prevents the picking up or giving off of moisture. The moisture in the seed is thus held in equilibrium thereby maintaining the viability of the seed for a long period of time and even from year to year.

It will be further understood that the coating is nontoxic to the seed and, with the exception of the fungicide, is nontoxic to humans. In some instances where favorable conditions prevail the fungicide such as the above noted Captan may be omitted.

The coated seed of the present invention also lends itself to broadcasting on a dry seed bed to which water is added later by flooding. In such a case the protective coating maintains the micronutrients in good condition regardless of different time intervals between broadcasting and flooding so that proper germination is not impaired.

I claim:

1. The method of seeding a flooded rice paddy comprising:
 coating each individual rice seed with a coating consisting essentially of a liquid saccharide and talc to increase the weight of the seed by at least 20%,
 passing said coated seeds to a finishing step wherein the seeds become discreet and free flowing, and
 applying said seeds in the absence of presoaking to said rice paddy by aerial broadcast.

2. The method of claim 1 wherein said coating includes micronutrients.

3. The method of claim 1 wherein said coating includes a fungicide.

4. The method of claim 1 wherein said saccharide is glucose.

* * * * *